United States Patent
Tan et al.

(10) Patent No.: US 11,062,421 B2
(45) Date of Patent: Jul. 13, 2021

(54) PANORAMIC IMAGE ACQUISITION DEVICE AND ACQUISITION METHOD THEREFOR

(71) Applicant: SHENZHEN KANDAO TECHNOLOGY CO., LTD., Shenzhen (CN)

(72) Inventors: Zhigang Tan, Shenzhen (CN); Zhijing Shao, Shenzhen (CN)

(73) Assignee: SHENZHEN KANDAO TECHNOLOGY CO., LTD., Shenzhen (CN)

( * ) Notice: Subject to any disclaimer, the term of this patent is extended or adjusted under 35 U.S.C. 154(b) by 348 days.

(21) Appl. No.: 16/478,563

(22) PCT Filed: May 11, 2016

(86) PCT No.: PCT/CN2016/081636
§ 371 (c)(1),
(2) Date: Jul. 17, 2019

(87) PCT Pub. No.: WO2017/185408
PCT Pub. Date: Nov. 2, 2017

(65) Prior Publication Data
US 2019/0378240 A1 Dec. 12, 2019

(30) Foreign Application Priority Data

Apr. 27, 2016 (CN) .......................... 201610272769.8

(51) Int. Cl.
*G06K 9/00* (2006.01)
*G06T 3/00* (2006.01)
(Continued)

(52) U.S. Cl.
CPC .............. *G06T 3/0043* (2013.01); *G06T 3/20* (2013.01); *G06T 15/205* (2013.01); *G06T 19/006* (2013.01)

(58) Field of Classification Search
None
See application file for complete search history.

(56) References Cited

U.S. PATENT DOCUMENTS

| 9,369,689 B1 * | 6/2016 | Tran ..................... H04N 13/246 |
| 2005/0141089 A1 * | 6/2005 | Grover .................. G02B 13/06 359/462 |

(Continued)

FOREIGN PATENT DOCUMENTS

| CN | 201440702 U | 4/2010 |
| CN | 102692806 A | 9/2012 |

(Continued)

OTHER PUBLICATIONS

State Intellectual Property Office of People's Republic of China, "International Search Report for PCT Application No. PCT/CN2016/081636", China, Dec. 30, 2016.

*Primary Examiner* — Randolph I Chu
(74) *Attorney, Agent, or Firm* — Locke Lord LLP; Tim Tingkang Xia, Esq.

(57) ABSTRACT

Provided in the present invention is a panoramic image acquisition device, which comprises a body, a plurality of cameras, a image extraction processor, and an image combination processor; the cameras being provided on the body at an approximate spacing between the human eyes, for acquiring partial pictures of a plurality of different shooting angles; the image extraction processor being connected to the plurality of cameras, for acquiring, on the basis of the human eyes simulating the orientations of the cameras, left-eye pictures and right-eye pictures of the partial pictures corresponding to the cameras; the image combination pro- (Continued)

cessor being connected to the image extraction processor, for combining the left-eye pictures of all the partial pictures into a left-eye panoramic picture and combining the right-eye pictures of all the partial pictures into a right-eye panoramic picture.

6 Claims, 8 Drawing Sheets

(51) Int. Cl.
    *G06T 3/20* (2006.01)
    *G06T 15/20* (2011.01)
    *G06T 19/00* (2011.01)

(56) References Cited

U.S. PATENT DOCUMENTS

| | | | | |
|---|---|---|---|---|
| 2006/0227417 | A1* | 10/2006 | Grover | G02B 30/36 |
| | | | | 359/462 |
| 2015/0341617 | A1* | 11/2015 | Cole | H04N 13/246 |
| | | | | 348/36 |
| 2016/0212409 | A1* | 7/2016 | Cole | H04N 13/194 |
| 2016/0239978 | A1* | 8/2016 | Cole | G06T 7/557 |
| 2016/0253809 | A1* | 9/2016 | Cole | H04N 13/161 |
| | | | | 345/672 |
| 2016/0323560 | A1* | 11/2016 | Jin | H04N 5/23238 |
| 2016/0360180 | A1* | 12/2016 | Cole | H04N 19/37 |
| 2017/0118458 | A1* | 4/2017 | Gronholm | G03B 35/08 |
| 2017/0295359 | A1* | 10/2017 | Cabral | H04N 13/243 |

FOREIGN PATENT DOCUMENTS

| | | |
|---|---|---|
| CN | 203133468 U | 8/2013 |
| CN | 104079917 A | 10/2014 |
| CN | 104506761 A | 4/2015 |
| CN | 105262949 A | 1/2016 |
| JP | 2007147341 A | 6/2007 |

* cited by examiner

PANORAMIC IMAGE ACQUISITION DEVICE AND ACQUISITION METHOD THEREFOR

CROSS-REFERENCE TO RELATED APPLICATIONS

This application claims the benefit of priority from Chinese Patent Application NO. 201610272769.8 entitled "PANORAMIC IMAGE ACQUISITION DEVICE AND PANORAMIC IMAGE ACQUISITION METHOD" and filed on Apr. 27, 2016, the content of which is hereby incorporated in its entire by reference.

FIELD

The present disclosure relates to the field of image processing technology, and more particularly, to a panoramic image acquisition method and a panoramic image acquisition device.

BACKGROUND

With the development of Virtual Reality (VR) and Augmented Reality (AR) technologies, a variety of VR applications have been developed, such as, 3D panoramic film playback, 3D panoramic game experience and 3D panoramic picture live broadcast, etc.

As a kind of VR application, the existing 3D panoramic film often needs to use a number of cameras with different shooting angles to record partial pictures of multiple different display areas, and then splicing operation is performed on the partial pictures of multiple different display areas, that is, the partial pictures of multiple different display areas are spliced together by using of splicing operation. However, the splicing operation here needs to be adjusted according to actual shooting conditions of different partial pictures, as a result, the splicing operation is tedious and difficult, and will consume a lot of image processing resources.

Therefore, it is necessary to provide a panoramic image acquisition method and a panoramic image acquisition device to solve the existing problems.

SUMMARY

Embodiments of the present disclosure provide a panoramic image acquisition method and a panoramic image acquisition device, which has relatively simple splicing procedure, relatively low difficulty in splicing operation and relatively less consumption of image processing resources, to solve the technical problems of procedures of image splicing operation being relatively tedious, the image splicing operation being relatively difficult, and more resources for image processing being consumed in existing panoramic image acquisition method and panoramic image acquisition device.

An embodiment of the present disclosure provides a panoramic image acquisition device, the panoramic image acquisition device, includes:

a polygonal cylinder;

a plurality of cameras provided on each side of a polygonal cross section of the polygonal cylinder at an approximate spacing between human eyes, a left-eye camera and a right-eye camera provided on each side of the polygonal cross section, for acquiring partial pictures of a plurality of different shooting angles; all the left-eye cameras and all the right-eye cameras located on the same cross section perpendicular to an extension direction of the polygonal cylinder;

an image extraction processor, connected to the plurality of cameras, for acquiring left-eye main pictures and right-eye synthetic pictures of the partial pictures corresponding to the left-eye cameras based on the human eyes simulating the orientations of the left-eye cameras and acquiring right-eye main pictures and left-eye synthetic pictures of the partial pictures corresponding to the right-eye cameras based on the human eyes simulating the orientations of the right-eye cameras;

an image combination processor, connected to the image extraction processor, for combining the left-eye synthetic pictures with two left-eye main pictures corresponding to two adjacent left-eye cameras to form a left-eye panoramic picture, and combining the right-eye synthetic pictures with two right-eye main pictures corresponding to two adjacent right-eye cameras to form a right-eye panoramic picture;

wherein, shooting optical axes of the left-eye camera and the right-eye camera located on each side are parallel to each other, and the left-eye cameras and the right-eye cameras located on the same polygonal cross section have roughly the same height.

An embodiment of the present disclosure provides a panoramic image acquisition device, the panoramic image acquisition device, includes:

a body;

a plurality of cameras provided on the body at an approximate spacing between human eyes, for acquiring partial pictures of a plurality of different shooting angles;

an image extraction processor, connected to the plurality of cameras, for acquiring left-eye pictures and right-eye pictures of the partial pictures corresponding to the plurality of cameras on the basis of the human eyes simulating the orientations of the plurality of cameras;

an image combination processor, connected to the image extraction processor, for combining the left-eye pictures of all the partial pictures into a left-eye panoramic picture, and combining the right-eye pictures of all the partial pictures into a right-eye panoramic picture.

An embodiment the present disclosure provides a panoramic image acquisition method executed by a panoramic camera to acquire panoramic pictures, the panoramic camera includes a body and a plurality of cameras arranged on a surface of the body; the panoramic image acquisition method includes:

acquiring partial pictures of a plurality of different shooting angles, wherein a distance between the cameras used for shooting the partial pictures is set as an approximate spacing between human eyes;

acquiring left-eye pictures and right-eye pictures of the partial pictures corresponding to the plurality of cameras on the basis of the human eyes simulating the orientations of the plurality of cameras;

combining the left-eye pictures of all the partial pictures into a left-eye panoramic picture and combining the right-eye pictures of all the partial pictures into a right-eye panoramic picture; and generating a 3D panoramic picture according to the left-eye panoramic picture and the right-eye panoramic picture.

Compared with the panoramic image acquisition method and panoramic image acquisition device in the prior art, in the panoramic image acquisition method and the panoramic image acquisition device of the present disclosure, since the distance between adjacent cameras is set as the approximate spacing between the human eyes, so that adjacent partial pictures can be directly used for picture splicing without the need for a complex image processing, which not only simplifies the difficulty in splicing adjacent partial pictures and reduces the resources used for image processing, but also solves the technical problems of procedures of image splicing operation being relatively tedious, the image splicing operation being relatively difficult, and more resources for image processing being consumed in existing panoramic image acquisition method and panoramic image acquisition device.

BRIEF DESCRIPTION OF THE DRAWINGS

Further details of the present disclosure are given hereinafter according to drawings and embodiments, and a brief description to the drawings used in detailed description of embodiments hereinafter is provided thereof.

DETAILED DESCRIPTION

Reference will now be made in detail to embodiments, examples of which are illustrated in the accompanying drawings. Obviously, the embodiments described hereinafter are only a part of the embodiments of the disclosure and not all of them. Based on the embodiments of the invention, all other embodiments obtained by persons of ordinary skills in this field without creative work shall fall within the protection scope of the present disclosure.

A panoramic image acquisition device and a panoramic image acquisition method of the present disclosure can be used to perform acquisition operation on panoramic images. Because adjacent cameras of the panoramic image acquisition device of the disclosure can be set at an approximate spacing between human eyes, so that the difficulty in splicing adjacent partial pictures can be better reduced, thereby reducing the resources used for image processing.

Figure 1A:
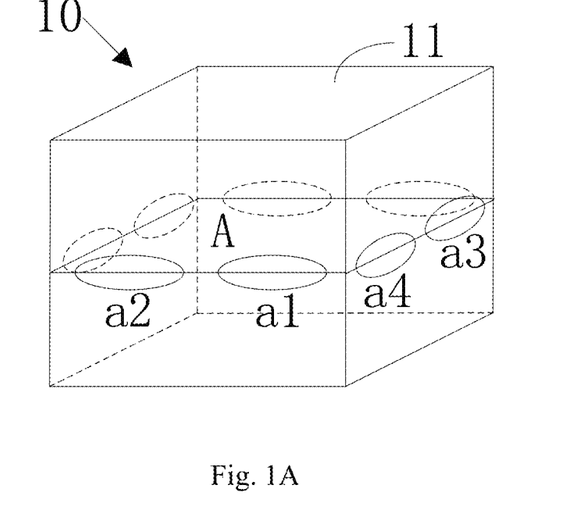
FIG. 1A is a structural diagram of a panoramic image acquisition device provided in a first embodiment of the present disclosure.
Figure 1B:
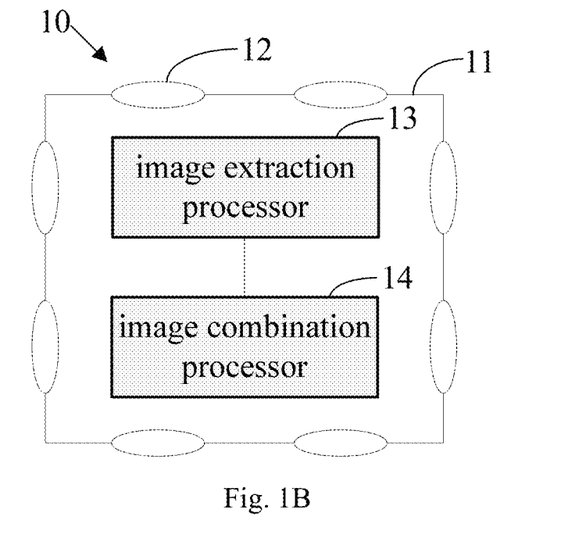
FIG. 1B is a sectional diagram of the panoramic image acquisition device as shown in FIG. 1A along a plane A.

Referring to FIGS. 1A and 1B, FIG. 1A is a structural diagram of a panoramic image acquisition device provided in a first embodiment of the present disclosure, FIG. 1B is a sectional diagram of the panoramic image acquisition device as shown in FIG. 1A along a plane A. In this embodiment, the panoramic image acquisition device 10 includes a body 11, a plurality of cameras 12, an image extraction processor 13, and an image combination processor 14. The cameras 12 are provided on the body 11 at an approximate spacing between the human eyes and are configured to acquire partial pictures of a plurality of different shooting angles.

The image extraction processor 13 are connected to the plurality of cameras 12, and are configured to acquire left-eye pictures and right-eye pictures of the partial pictures corresponding to the cameras 12 on the basis of the human eyes simulating the orientations of the cameras 12. The image combination processor 14 is connected to the image extraction processor 13, and configured to combine the left-eye pictures of all the partial pictures into a left-eye panoramic picture and combine the right-eye pictures of all the partial pictures into a right-eye panoramic picture.

In this embodiment, the body 11 can be a polygonal cylinder whose cross section is a polygon, which form a polygonal cross section. A left-eye camera and a right-eye camera are set on each side of the polygonal cross section of the polygonal cylinder. All the left-eye cameras and the right-eye cameras are located on the same cross section perpendicular to the extension direction of the polygonal cylinder, that is, the cross section of the body 11 is perpendicular to the extension direction of the polygonal cylinder. Shooting optical axes of the left-eye camera and the right-eye camera located on each side are parallel to each other. The height of all the left-eye cameras and the right-eye cameras located on the same polygonal cross section is approximately the same, or the polygonal cross section is approximately parallel to a shooting plane. That is, all the left-eye cameras and the right-eye cameras located on the same polygonal cross section have roughly the same height, and the polygonal cross section is roughly parallel to the shooting plane.

A straight-line distance between the left-eye camera and the right-eye camera located on the nearest neighboring side to the left-eye camera can be the approximate spacing between the human eyes. A straight-line distance between the right-eye camera and the left-eye camera located on the nearest neighboring side to the right-eye camera can also be the approximate spacing between the human eyes.

The image extraction processor 13 is specifically configured to acquire left-eye main pictures and right-eye synthetic pictures of the partial pictures corresponding to the left-eye cameras on the basis of the human eyes simulating the orientations of the left-eye cameras, and configured to acquire right-eye main pictures and left-eye synthetic pictures of the partial pictures corresponding to the right-eye cameras on the basis of the human eyes simulating the orientations of the right-eye cameras.

The image combination processor 14 is specifically configured to combine the left-eye synthetic pictures with two left-eye main pictures corresponding to two adjacent left-eye cameras to form the left-eye panoramic picture, and configured to combine the right-eye synthetic pictures with two right-eye main pictures corresponding to two adjacent right-eye cameras to form the right-eye panoramic picture.

Referring to FIGS. 1A and 1B, when the panoramic image acquisition device 10 of this embodiment is in use, the plurality of cameras 12 acquire the partial pictures corresponding to different shooting angles. Since adjacent cameras 12 can be set on the body 11 at the approximate spacing between the human eyes, pictures acquired by two cameras 12 located on each side of the polygonal cross section of the body 11 can be exactly equal to pictures watched by the left eye and the right eye of people at this side. In this way, the pictures acquired by the cameras on the sides of the polygonal cross section can be equal to the pictures watched by people at the sides in multiple directions (the number of directions is equal to the number of sides of the polygonal cross section). As shown in FIG. 1A, the polygonal cross section is a quadrilateral with four sides representing four different orientations, so that the pictures viewed by people in four different orientations including front, back, left and right directions, which correspond to the partial pictures in front, back, left and right directions.

In this embodiment, the approximate spacing between the human eyes is about 40 mm to 70 mm. When the device is designed for children, the approximate spacing between the human eyes can be set from 53 mm to 57 mm. When the device is designed for adult females, the approximate spacing between the human eyes can be set from 56 mm to 64 mm. When the device is designed for adult males, the approximate spacing between the human eyes can be set from 60 mm to 70 mm. When the device is designed for infants, the approximate spacing between the human eyes can be set from 38 mm to 45 mm.

The image extraction processor 13 acquires the partial pictures taken by each camera 12, and acquires the left-eye main pictures and the right-eye synthetic pictures of the partial pictures corresponding to the left-eye cameras on the basis of the human eyes simulating the orientations of the left-eye cameras, and acquires the right-eye main pictures and the left-eye synthetic pictures of the partial pictures corresponding to the right-eye cameras on the basis of the human eyes simulating the orientations of the right-eye cameras.

Figure 1C:
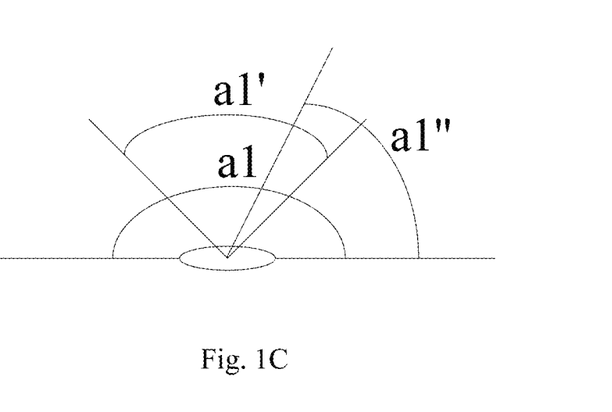
FIG. 1C is a partial diagram of a camera of the panoramic image acquisition device provided in the first embodiment of the present disclosure.

Because a shooting range of each left-eye camera is much larger than a normal viewing range of the human eyes, for example, the shooting range of the left-eye camera is 180 degrees, and the normal viewing range of the human eyes is 120 degrees, that is, the normal viewing range of the human eyes is within the shooting range of each left-eye camera, so the partial pictures in the middle 120 degrees range of the shooting range of the left-eye camera can be acquired as the left-eye main pictures of the left-eye camera. That is, the pictures within the middle 120-degree range (such as the normal viewing range of the human eyes) of the shooting range of the left-eye camera are obtained as the partial pictures, and the partial pictures are taken as the left-eye main pictures of the left-eye camera. In this way, the left-eye main pictures a1 'of the left-eye camera a1 and the left-eye main pictures a3' of the left-eye camera a3 can be acquired, and the right-eye main pictures a2 'of the right-eye camera a2 and the right-eye main pictures a4' of the right-eye camera a4 can be obtained. Here, the shooting range corresponding to the left-eye main pictures is the human eyes simulating the orientations of the left-eye camera. As shown in FIG. 1C for details.

Figure 1D:
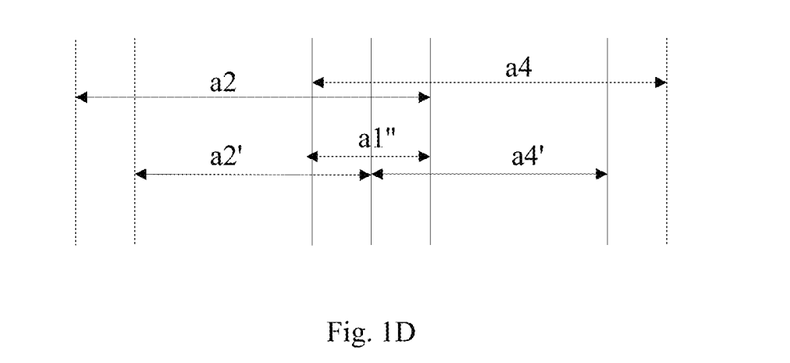
FIG. 1D is a splicing schematic diagram of the panoramic image acquisition device provided in the first embodiment of the present disclosure.

Referring to FIGS. 1C and 1D, in order to smoothly splicing the right-eye main pictures a2' of the right-eye camera a2 and the right-eye main pictures a4' of the right-eye camera a4, the image extraction processor 13 is further configured to acquire the partial pictures within the left 90-degree range of the shooting range of the left-eye camera a1 as the right-eye synthetic pictures a1" of the left-eye camera a1, that is, the partial pictures within the left 90-degree range of the shooting range of the left-eye camera a1 can be taken as the right-eye synthetic pictures a1" of the left-eye camera a1. The right-eye synthetic pictures a1" of the left-eye camera a1 combines part of right-eye main pictures a2' of the right-eye camera a2 and the right-eye main pictures a4' of the right-eye camera a4, so it can be used for performing splicing operation on the part of right-eye main pictures a2' of the right-eye camera a2 and the right-eye main pictures a4' of the right-eye camera a4. That is, due to the right-eye synthetic pictures a1" of the left-eye camera a1 combined with part of right-eye main pictures a2' of the right-eye camera a2 and the right-eye main pictures a4' of the right-eye camera a4, so the part of right-eye main pictures a2' of the right-eye camera a2 can be spliced with the right-eye main pictures a4' of the right-eye camera a4.

In this embodiment, the viewing ranges corresponding to the left-eye main pictures and the right-eye main pictures can be adjusted according to user's setting. For example, the viewing ranges can be from 90 degrees to 150 degrees. The viewing ranges of the left-eye synthetic pictures and the right-eye synthetic pictures can also be adjusted according to user's setting, such as ranging from 45 degrees to 120 degrees. The viewing ranges of the left-eye synthetic pictures should be smaller than the viewing ranges of the left-eye main pictures, and the viewing ranges of the right-eye synthetic pictures should be smaller than those of the right-eye main pictures.

In this embodiment, the image combination processor 14 acquires, from the image extraction processor 13, the left-eye main pictures and the right-eye synthetic pictures of the partial pictures corresponding to all the left-eye cameras, and the right-eye main pictures and the lift-eye synthetic pictures of the partial pictures corresponding to all the right-eye cameras.

In this embodiment, the image combination processor 14 combines the left-eye synthetic pictures with two left-eye main pictures corresponding to two adjacent left-eye cameras to form the left-eye panoramic picture, and combines the right-eye synthetic pictures with two right-eye main pictures corresponding to two adjacent right-eye cameras to form the right-eye panoramic picture.

Therefore, the process of panoramic image acquisition executed by the panoramic image acquisition device 10 is completed.

In one embodiment, a straight-line distance between the left-eye camera a1 and the right-eye camera a4 can also be the approximate spacing between the human eyes, so the right-eye synthetic pictures a1" of the left-eye cameras a1 and the left-eye synthetic pictures a4" of the right-eye cameras a4 can better reflect viewing pictures acquired when people is in the orientations between the left-eye cameras a1 and the left-eye cameras a3, without the need for performing image processing on the right-eye synthetic pictures a1" and the left-eye synthetic pictures a4" based on the approximate spacing between the human eyes.

Therefore, in the panoramic image acquisition device of this embodiment, adjacent cameras of the panoramic image acquisition device are equipped at an approximate spacing between the human eyes, so that the difficulty in splicing adjacent partial pictures can be better simplified, thereby reducing the resources used for image processing.

Figure 2A:
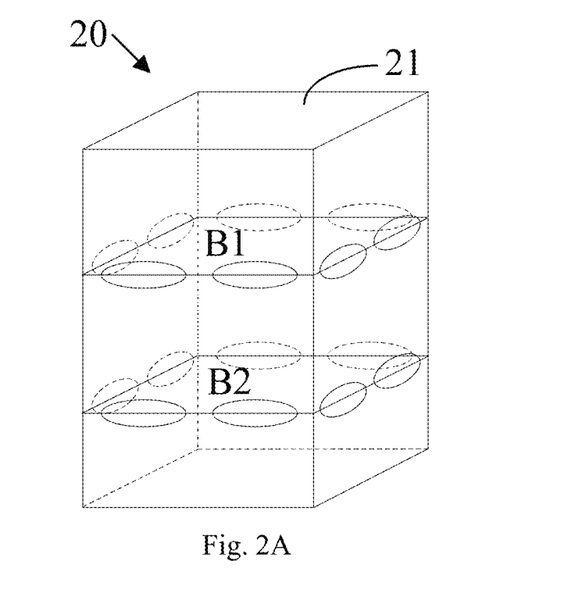
FIG. 2A is a structural diagram of a panoramic image acquisition device provided in a second embodiment of the present disclosure.
Figure 2B:
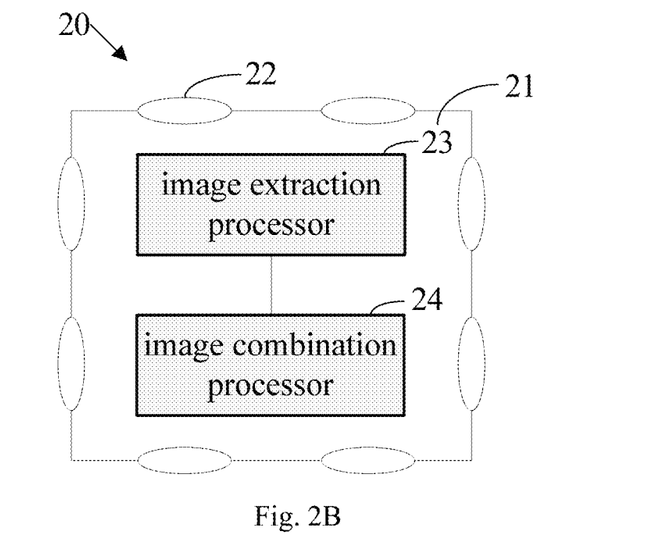
FIG. 2B is a sectional diagram of the panoramic image acquisition device as shown in FIG. 2A along a plane B1 or a plane B2.

Referring to FIGS. 2A and 2B, FIG. 2A is a structural diagram of a panoramic image acquisition device provided in a second embodiment of the present disclosure, FIG. 2B is a sectional diagram of the panoramic image acquisition device as shown in FIG. 2A along a plane B1 or a plane B2. In this embodiment, the panoramic image acquisition device 20 includes a body 21, a plurality of cameras 22, an image extraction processor 23, and an image combination processor 24. On the basis of the panoramic image acquisition device 10 provided in the first embodiment, the body 21 of the panoramic image acquisition device 20 can also be a polygonal cylinder whose cross section is a polygonal cross section. In this embodiment, the polygonal cylinder is provided with two polygonal cross sections, and the cameras 22 are located on each polygonal cross section, for example, two cameras 22 are set on each side of any polygonal cross section of the polygonal cylinder. The specific working principle of the cameras 22 on each polygonal cross section in this embodiment is the same as that of the cameras 12 of the panoramic image acquisition device 10 provided in the first embodiment, please refer to relevant descriptions of the panoramic image acquisition device in the first embodiment mentioned above.

In the embodiment, in order to further improve picture acquisition quality of the panoramic image acquisition device 20, a plurality of polygonal cross sections can be set on the polygonal cylinder (namely the body 21), and each polygonal cross section is provided with multiple cameras 22.

On the basis of the first embodiment, the panoramic image acquisition device 20 of this embodiment has a plurality of polygonal cross sections, and each polygonal cross section is provided with multiple cameras, so that the cameras on each polygonal cross section can acquire the panoramic pictures with different fixed heights, thereby further improving the picture acquisition quality of the panoramic image acquisition device.

Figure 3A:
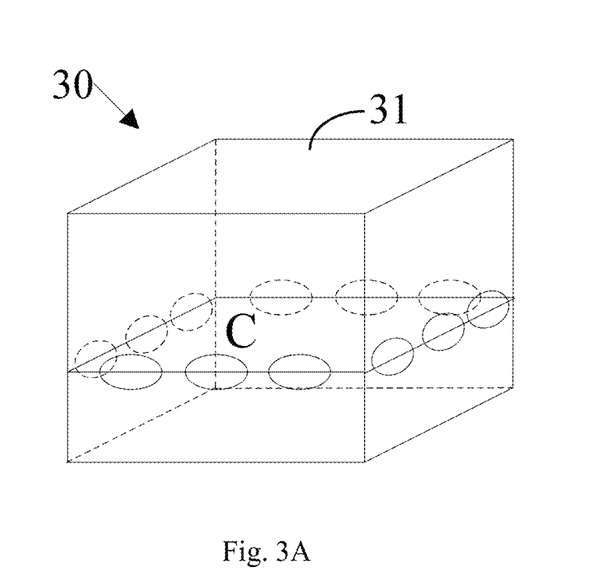
FIG. 3A is a structural diagram of a panoramic image acquisition device provided in a third embodiment of the present disclosure.
Figure 3B:
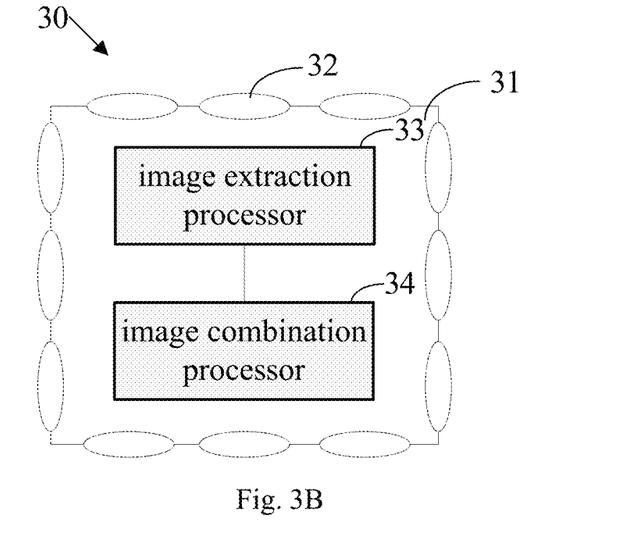
FIG. 3B is a sectional diagram of the panoramic image acquisition device as shown in FIG. 3A along a plane C.

Referring to FIGS. 3A and 3B, FIG. 3A is a structural diagram of a panoramic image acquisition device provided in a third embodiment of the present disclosure, FIG. 3B is a sectional diagram of the panoramic image acquisition device as shown in FIG. 3A along a plane C. In this embodiment, the panoramic image acquisition device 30 includes a body 31, a plurality of cameras 32, an image extraction processor 33, and an image combination processor 34. On the basis of the panoramic image acquisition device 10 provided in the first embodiment, the body 31 of the panoramic image acquisition device 30 can be a polygonal cylinder whose cross section is a polygonal cross section. In this embodiment, each side of the polygonal cross section is equipped with at least three cameras 32, that is, at least three cameras 32 are located on each side of the polygonal cross section of the polygonal cylinder, and all the cameras 32 are located on the same cross section of the body 31 perpendicular to the extension direction of the polygonal cylinder.

The specific working principle of the cameras 32 on the polygonal cross section in this embodiment is the same as that of the cameras 12 of the panoramic image acquisition device 10 provided in the first embodiment. Because at least three cameras 32 are equipped on each side of the polygonal cross section of the panoramic image acquisition device 30, so that acquisition accuracy of the partial pictures can be improved without any increase in the number of sides of the polygonal cross section. In this embodiment, at least three cameras 32 are directly equipped on each side of polygonal cross section to improve the acquisition accuracy of the partial pictures, and a spacing between adjacent cameras 32 is the approximate spacing between the human eyes, which can ensure that acquired partial pictures can be directly used for picture splicing, without the need for a complex image processing.

On the basis of the first embodiment, the panoramic image acquisition device 30 of this embodiment is configured with at least three cameras on each side of the polygonal cross section, which can further improve the image acquisition quality of the panoramic image acquisition device. It should be understandable that setting principle of cameras in this embodiment are also applicable to the panoramic image acquisition device including a number of polygonal cross sections with cameras on each polygonal cross section.

Figure 4A:
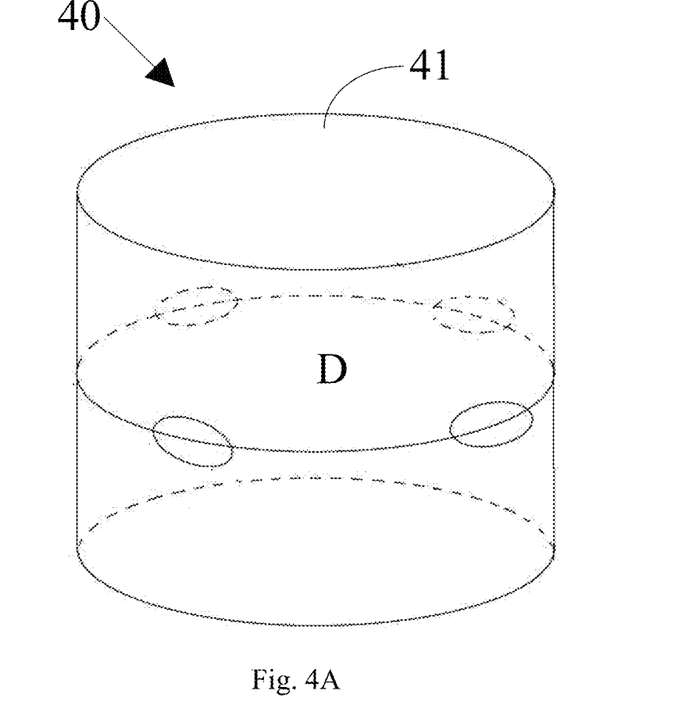
FIG. 4A is a structural diagram of a panoramic image acquisition device provided in a fourth embodiment of the present disclosure.
Figure 4B:
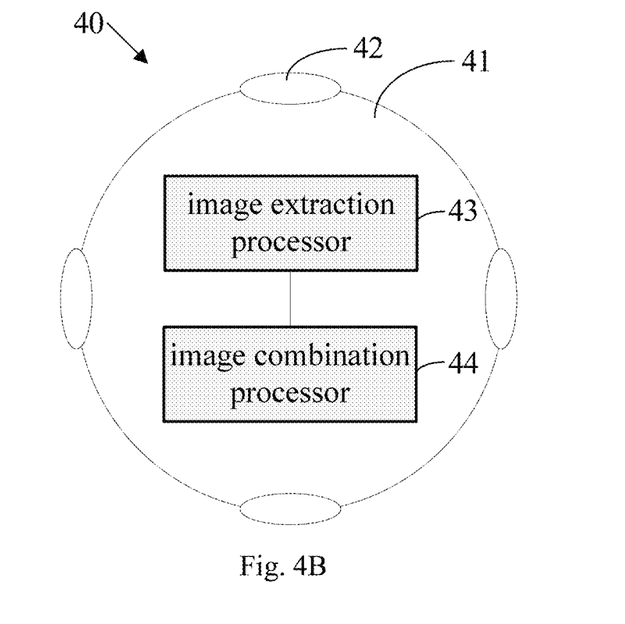
FIG. 4B is a sectional diagram of the panoramic image acquisition device as shown in FIG. 4A along a plane D.

Referring to FIGS. 4A and 4B, FIG. 4A is a structural diagram of a panoramic image acquisition device provided in a fourth embodiment of the present disclosure, and FIG. 4B is a sectional diagram of the panoramic image acquisition device as shown in FIG. 4A along a plane D. In this embodiment, the panoramic image acquisition device 40 includes a body 41, a plurality of cameras 42, an image extraction processor 43, and an image combination processor 44. On the basis of the panoramic image acquisition device 10 in the first embodiment, the body 41 of the panoramic image acquisition device 40 in this embodiment is a cylinder, and the plurality of cameras 42 are provided on a surface of the body 41 at equal intervals. All the cameras 42 are located on the same cross section of the body 41, and the cross section is perpendicular to the extension direction of the cylinder.

On the basis of the first embodiment, the body 41 of the panoramic image acquisition device 40 in this embodiment is configured as a cylinder, which makes the cameras 42 to be set more conveniently and makes it easier to set up the cameras 42, and further improve the convenience of the setting of cameras 42. Moreover, a spacing between adjacent cameras 42 is the approximate spacing between the human eyes, which can ensure that acquired partial pictures can be directly used for picture splicing, without the need for a complex image processing.

On the basis of the first embodiment, the panoramic image acquisition device 40 of this embodiment includes a body designed as a cylinder, and a plurality of cameras are located on the surface of the body at equal intervals, which can further improve the convenience of the setting of cameras of the panoramic image acquisition device. Understandably, the setting principle of cameras in this embodiment are also applicable to the panoramic image acquisition device including a number of polygonal cross sections with cameras on each polygonal cross section.

Figure 5A:
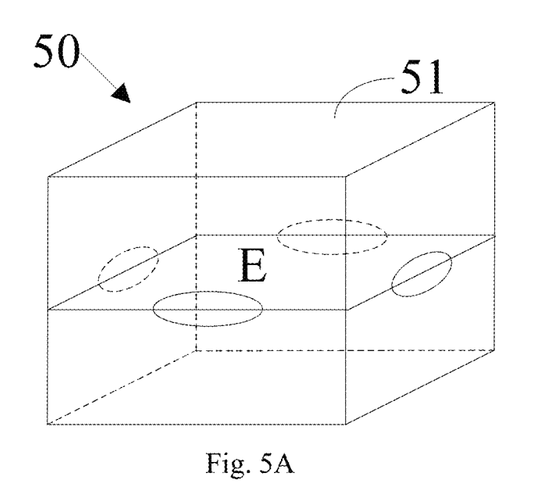
FIG. 5A is a structural diagram of a panoramic image acquisition device provided in a fifth embodiment of the present disclosure.
Figure 5B:
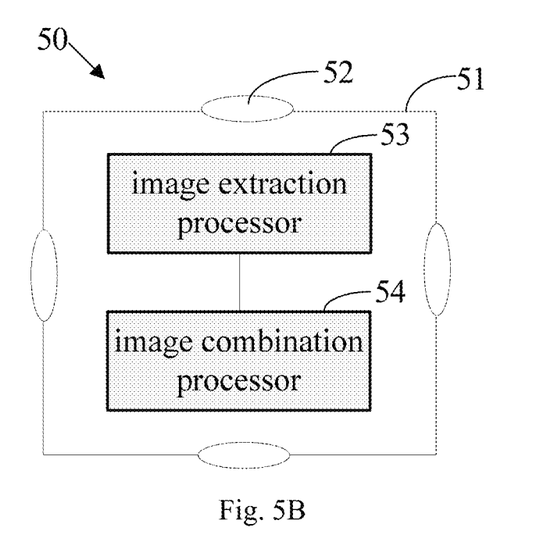
FIG. 5B is a sectional diagram of the panoramic image acquisition device as shown in FIG. 5A along a plane E.

Referring to FIGS. 5A and 5B, FIG. 5A is a structural diagram of a panoramic image acquisition device provided in a fifth embodiment of the present disclosure, FIG. 5B is a sectional diagram of the panoramic image acquisition device as shown in FIG. 5A along a plane E. In this embodiment, the panoramic image acquisition device 50 includes a body 51, a plurality of cameras 52, an image extraction processor 53, and an image combination processor 54. On the basis of the panoramic image acquisition device 10 in the first embodiment, the body 51 of the panoramic image acquisition device 50 can be a polygonal cylinder whose cross section is a polygonal cross section. In this embodiment, each side of the polygonal cross section is equipped with one camera 52, that is, only one camera 52 is provided on each side of the polygonal cross section of the polygonal cylinder, and all the cameras 52 are located on the same cross section of the body 51 perpendicular to the extension direction of the polygonal cylinder.

The specific working principle of the cameras 52 on the polygonal cross section in this embodiment is the same as that of the cameras 12 of the panoramic image acquisition device 10 provided in the first embodiment. Because only one camera 52 is equipped on each side of the polygonal cross section of the panoramic image acquisition device 50, under the conditions that the panoramic image acquisition device has the same number of cameras 52, the panoramic image acquisition device 50 of this embodiment has a higher accuracy in setting the shooting angles of the cameras. Moreover, a spacing between adjacent cameras 52 is set to the approximate spacing between the human eyes, which can ensure that acquired partial pictures can be directly used for picture splicing, without the need for a complex image processing.

On the basis of the first embodiment, the panoramic image acquisition device of this embodiment has only one camera on each side of the polygonal cross section, which can further improve the shooting accuracy of the panoramic image acquisition device. It is understandable that the setting principle of cameras in this embodiment are also applicable to the panoramic image acquisition device including a number of polygonal cross sections with cameras on each polygonal cross section.

Figure 6:
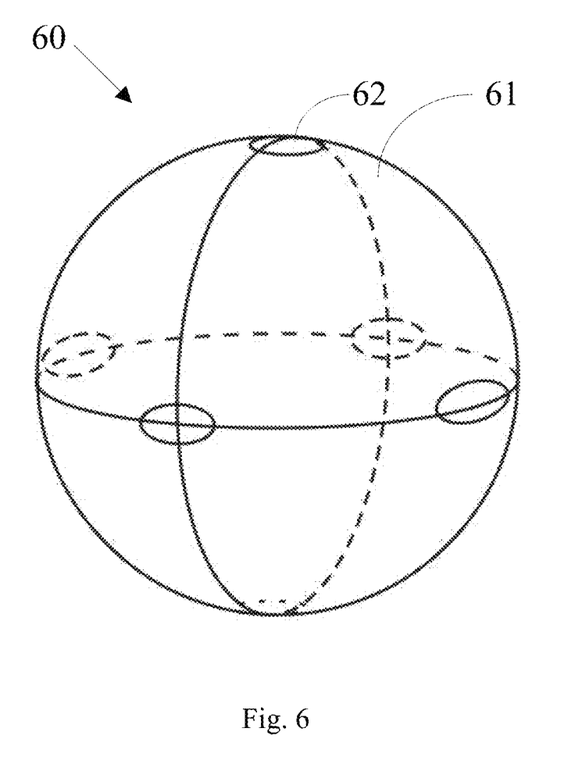
FIG. 6 is a structural diagram of a panoramic image acquisition device provided in a sixth embodiment of the present disclosure.

Referring to FIG. 6, FIG. 6 is a structural diagram of a panoramic image acquisition device provided in a sixth embodiment of the present disclosure. In this embodiment, the panoramic image acquisition device 60 includes a body 61, a plurality of cameras 62, an image extraction processor (no shown), and an image combination processor (no shown). On the basis of the panoramic image acquisition device in the first embodiment, the body 61 of the panoramic image acquisition device 60 can be a sphere, and the plurality of cameras 61 are located on the surface of the sphere at equal intervals. four different orientations including front, back, left and right directions, On the basis of the first embodiment, the body 61 is not only equipped with cameras 62 in front, back, left and right directions, but also equipped with cameras 62 in both upper and lower directions of the panoramic image acquisition device 60, so that the panoramic image acquisition device 60 can further acquire the panoramic pictures above the body 61 shot by the camera in the upper direction and the panoramic pictures under the body 61 shot by the camera in the lower direction of the panoramic image acquisition device. Thus, the panoramic image acquisition device 60 can collect and acquire the partial pictures in six different orientations including front, back, left, right, upper and lower directions to collect and obtain complete partial pictures, further improving the integrity of acquiring the partial pictures. Moreover, the spacing between adjacent cameras 62 can be set to the approximate spacing between the human eyes, which can ensure that acquired partial pictures can be directly used for picture splicing, without the need for a complex image processing.

On the basis of the first embodiment, the panoramic image acquisition device 60 of this embodiment includes a body designed as a sphere, and a plurality of cameras are located on the surface of the sphere at equal intervals, which can collect relatively complete partial pictures and further improve the integrity of acquiring the partial pictures of the panoramic image acquisition device.

Figure 7:
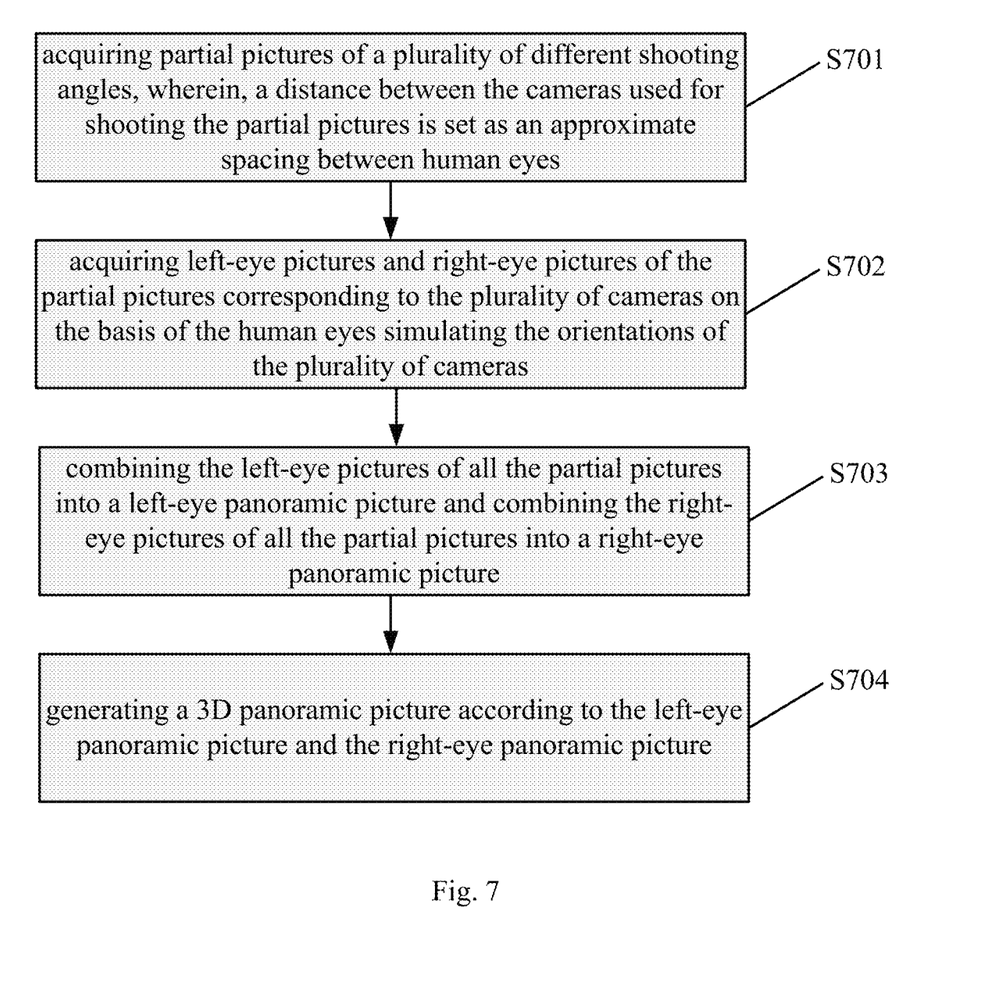
FIG. 7 is a flowchart of a panoramic image acquisition method provided in one embodiment of the present disclosure.

The disclosure further provides a panoramic image acquisition method. Please refer to FIG. 7, FIG. 7 is a flowchart of a panoramic image acquisition method provided in one embodiment of the present disclosure. The panoramic image acquisition method of this embodiment is applied to a panoramic camera to perform panoramic image acquisition, that is, the panoramic image acquisition method is executed by a panoramic camera to acquire panoramic pictures. Where, the panoramic camera includes a body and a plurality of cameras arranged on a surface of the body. The panoramic image acquisition method in this embodiment of the present invention includes the following steps:

Step S701: acquiring partial pictures of a plurality of different shooting angles, wherein, a distance between the cameras used for shooting the partial pictures is set as an approximate spacing between human eyes;

Step S702: acquiring left-eye pictures and right-eye pictures of the partial pictures corresponding to the plurality of cameras on the basis of the human eyes simulating the orientations of the plurality of cameras;

Step S703: combining the left-eye pictures of all the partial pictures into a left-eye panoramic picture and combining the right-eye pictures of all the partial pictures into a right-eye panoramic picture;

Step S704: generating a 3D panoramic picture according to the left-eye panoramic picture and the right-eye panoramic picture.

Detailed process of each step of the panoramic image acquisition method in this embodiment is explained in detail below.

In step 701, the panoramic camera can obtain the partial pictures of a plurality of different shooting angles by use of the plurality of cameras. Since the distance between adjacent cameras is the approximate spacing between the human eyes, so acquired partial pictures can be directly used for picture splicing without the need for a complex image processing. Then go to step S702.

In step S702, the panoramic camera acquires the left-eye pictures and the right-eye pictures of the partial pictures corresponding to the cameras on the basis of the human eyes simulating the orientations of the cameras. The human eyes simulating the orientations here are main shooting ranges of the cameras. In the main shooting ranges, the cameras can acquire the pictures with high quality to ensure better picture shooting quality. Because each camera can be used to record the left-eye pictures, and can be used to record the right-eye pictures, so that the panoramic camera can acquire the left-eye pictures and the right-eye pictures of the partial pictures corresponding to the cameras. Then go to step S703.

In step S703, the panoramic camera can combine the left-eye pictures of all the partial pictures into the left-eye panoramic picture, and combine the right-eye pictures of all the partial pictures into the right-eye panoramic picture. Here, the right-eye picture between two left-eye pictures can be used to splice two adjacent left-eye pictures, and the left-eye picture between two right-eye pictures can be used to splice two adjacent right-eye pictures. Then go to step S704.

In step S704, the panoramic camera can generate a corresponding 3D panoramic picture according to the left-eye panoramic picture and the right-eye panoramic picture obtained in step S703.

Therefore, the panoramic image acquisition process of the panoramic image acquisition method in this embodiment is completed as mentioned above.

In summary, embodiments of the present disclosure provide a panoramic image acquisition device and a panoramic image acquisition method, since the distance between adjacent cameras is set as the approximate spacing between the human eyes, so that adjacent partial pictures can be directly used for picture splicing without the need for a complex image processing, which not only simplifies the difficulty in splicing adjacent partial pictures and reduces the resources used for image processing, but also solves the technical problems of procedures of image splicing operation being relatively tedious, the image splicing operation being relatively difficult, and more resources for image processing being consumed in existing panoramic image acquisition method and panoramic image acquisition device.

The terms used in this disclosure such as "component", "module", "system", "interface", "process" and so on, are generally intended to refer to computer-related entities: hardware, combinations of hardware and software, software or software in process. For example, a component may be, but is not limited to, a process running on a processor, the processor, an object, an executable application, an executing thread, a program, and/or a computer. The application running on a controller and the controller can both be components, as illustrated in the drawings. One or more components can be run in the processes and/or threads that are executing, and the components can be located on one computer and/or distributed between two or more computers.

Various operations of embodiments in this disclosure are provided here. In one embodiment, one or more of the operations can constitute computer readable instructions stored on one or more computer readable storage media, which, when executed by an electronic device, will a computing device to perform the operations. The order in which some or all operations are described should not be interpreted to imply that they must be sequential. Persons of ordinary skills in the art will understand alternative sequences that have the benefits of this specification. Furthermore, it should be understood that not all operations must exist in each embodiment provided herein.

Moreover, the word "preferred" used in this disclosure means used as an embodiment, an example, or an illustration. Any aspect or design described in this disclosure as "preferred" need not be interpreted to be more advantageous than any other aspects or designs. Instead, the use of the word "preferred" aims to present concepts in concrete ways. The term "or" as used in this disclosure is intended to mean the contained "or" and not the excluded "or". That is, unless otherwise specified or made clear from the context, "X uses A or B" means any of the permutations that naturally include. That is, if X uses A; X uses B; or X uses both A and B, then "X uses A or B" is satisfied in either of the above examples.

Furthermore, although this disclosure has been shown and described in relation to one or more implementations, persons of ordinary skills in the art will think of equivalent variations and modifications based on reading and understanding of this specification and drawings. This disclosure includes all such modifications and variations and is limited only by the scope of the attached claims. in particular, with regard to a variety of functions performed by the components (such as elements, resources, etc.), the terms used to describe the components above-mentioned are armed at corresponding to any component (unless otherwise indicated) executing specified function (such as its equivalent function) of the components, even in the structure and implementation in this disclosure, as shown in this demonstration way to realize the functions of public open structure is not equal. Furthermore, although the particular feature of this disclosure has been disclosed in relation to only one of several implementations, it may be combined with one or more other features that may be expected and advantageous for such as a given or particular application. Further, so far as the term "includes", "has", "contains" or a variant thereof being used in a particular embodiment or claim, such term is intended to be included in a manner similar to the term "includes".

Each functional unit in the embodiment of the disclosure can be integrated in a processing module, or each functional unit may exist physically independently, or two or more functional units can be integrated in a module. The integrated modules mentioned-above can be implemented in the form of hardware or software function modules. The integrated modules may also be stored in a computer readable storage medium when it is implemented as a software function module and sold or used as an independent product. The computer readable storage medium mentioned above can be a read-only memory, a disk or a CD-ROM, etc. Each device or system may implement the method in the corresponding method embodiments.

Although the invention is described in combination with specific features and embodiments, it is evident that it can be modified and combined in various ways without departing from the spirit and scope of the invention. Accordingly, this specification and accompanying drawings are only exemplary descriptions of the invention as defined by the claims and are deemed to cover any and all modifications, variations, combinations or equivalents within the scope of the invention. The foregoing descriptions are merely exemplary embodiments of the present invention, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

What is claimed is:

1. A panoramic image acquisition device, comprising:
a body;
a plurality of cameras provided on the body at an approximate spacing between human eyes, for acquiring partial pictures of a plurality of different shooting angles;
an image extraction processor, connected to the plurality of cameras, for acquiring left-eye pictures and right-eye pictures of the partial pictures corresponding to the plurality of cameras on the basis of the human eyes simulating the orientations of the plurality of cameras;
an image combination processor, connected to the image extraction processor, for combining the left-eye pictures of all the partial pictures into a left-eye panoramic picture, and combining the right-eye pictures of all the partial pictures into a right-eye panoramic picture,
wherein the body is a polygonal cylinder, two cameras are located on each side of a polygonal cross section of the polygonal cylinder, and all the cameras are located on the same cross section of the body perpendicular to an extension direction of the polygonal cylinder;
wherein a left-eye camera and a right-eye camera are provided on each side of the polygonal cross section, a straight-line distance between the left-eye camera and the right-eye camera located on the nearest neighboring side to the left-eye camera is the approximate spacing between the human eyes, and the straight-line distance between the right-eye camera and the left-eye camera located on the nearest neighboring side to the right-eye camera is the approximate spacing between the human eyes; and wherein the image extraction processor is configured to:
acquire left-eye main pictures and right-eye synthetic pictures of the partial pictures corresponding to the left-eye cameras based on the human eyes simulating the orientations of the left-eye cameras; and
acquire right-eye main pictures and left-eye synthetic pictures of the partial pictures corresponding to the right-eye cameras based on the human eyes simulating the orientations of the right-eye cameras; and
wherein the image combination processor is configured to:
combine the left-eye synthetic pictures with two left-eye main pictures corresponding to two adjacent left-eye cameras to form the left-eye panoramic picture; and
combine the right-eye synthetic pictures with two right-eye main pictures corresponding to two adjacent right-eye cameras to form the right-eye panoramic picture.

2. The panoramic image acquisition device of claim 1, wherein shooting optical axes of the two cameras located on each side are parallel to each other.

3. The panoramic image acquisition device of claim 1, wherein all the cameras located on the same polygonal cross section have roughly the same height.

4. A panoramic image acquisition method executed by a panoramic camera to acquire panoramic pictures, wherein the panoramic camera comprises a body and a plurality of cameras arranged on a surface of the body; the panoramic image acquisition method comprising:
acquiring partial pictures of a plurality of different shooting angles, wherein a distance between the cameras used for shooting the partial pictures is set as an approximate spacing between human eyes;
acquiring left-eye pictures and right-eye pictures of the partial pictures corresponding to the plurality of cameras on the basis of the human eyes simulating the orientations of the plurality of cameras;
combining the left-eye pictures of all the partial pictures into a left-eye panoramic picture and combining the right-eye pictures of all the partial pictures into a right-eye panoramic picture; and
generating a 3D panoramic picture according to the left-eye panoramic picture and the right-eye panoramic picture,
wherein the body is a polygonal cylinder, two cameras are located on each side of a polygonal cross section of the polygonal cylinder, and all the cameras are located on the same cross section of the body perpendicular to an extension direction of the polygonal cylinder;
wherein the step of acquiring left-eye pictures and right-eye pictures of the partial pictures corresponding to the plurality of cameras on the basis of the human eyes simulating the orientations of the plurality of cameras, comprising:
acquiring left-eye main pictures and right-eye synthetic pictures of the partial pictures corresponding to the left-eye cameras based on the human eyes simulating the orientations of the left-eye cameras;
acquiring right-eye main pictures and left-eye synthetic pictures of the partial pictures corresponding to the right-eye cameras based on the human eyes simulating the orientations of the right-eye cameras; and
wherein the step of combining the left-eye pictures of all the partial pictures into a left-eye panoramic picture and combining the right-eye pictures of all the partial pictures into a right-eye panoramic picture, comprising:
combining the left-eye synthetic pictures with two left-eye main pictures corresponding to two adjacent left-eye cameras to form the left-eye panoramic picture; and
combining the right-eye synthetic pictures with two right-eye main pictures corresponding to two adjacent right-eye cameras to form the right-eye panoramic picture.

5. The panoramic image acquisition method of claim 4, wherein shooting optical axes of the two cameras located on each side are parallel to each other.

6. The panoramic image acquisition method of claim 4, wherein all the cameras located on the same polygonal cross section have roughly the same height.

* * * * *